United States Patent [19]

Runge et al.

[11] Patent Number: 5,307,070
[45] Date of Patent: Apr. 26, 1994

[54] METHOD FOR RESOLVING AMBIGUITY IN THE DETERMINATION OF ANTENNA ANGLE OF VIEW AND DOPPLER FREQUENCY IN SYNTHETIC APERTURE RADAR

[75] Inventors: Hartmut Runge, Seefeld; Richard Bamler, Gilching, both of Fed. Rep. of Germany

[73] Assignee: Deutsche Forschungsanstalt fur Luft-und Raumfahrt, Köln, Fed. Rep. of Germany

[21] Appl. No.: 749,080

[22] Filed: Aug. 23, 1991

[30] Foreign Application Priority Data

Aug. 25, 1990 [DE] Fed. Rep. of Germany ....... 4026874

[51] Int. Cl.[5] .............................................. G01S 13/90
[52] U.S. Cl. ...................................................... 342/25
[58] Field of Search .......................................... 342/25

[56] References Cited

U.S. PATENT DOCUMENTS

| | | | |
|---|---|---|---|
| 3,768,096 | 10/1973 | Dentino | 342/25 X |
| 4,563,686 | 1/1986 | Boles | 342/25 X |
| 4,924,229 | 5/1990 | Eichel et al. | 342/25 |
| 4,929,950 | 5/1990 | Freeman et al. | 342/25 |
| 4,985,704 | 1/1991 | Smith | 342/25 |

FOREIGN PATENT DOCUMENTS 0048704 2/1985 Fed. Rep. of Germany.
8904976 6/1989 Fed. Rep. of Germany.

OTHER PUBLICATIONS

Ellis, A.B.E.: "The Processing of Synthetic Aperture Radar Signals" in BG-2: GEC Journal of Research, vol. 2, No. 3, 184, pp. 169–177.

Primary Examiner—Gilberto Barron, Jr.
Attorney, Agent, or Firm—Browdy and Neimark

[57] ABSTRACT

In a method for resolving ambiguity in the determination of antenna angle of view and Doppler frequency in synthetic aperture radar (SAR), by evaluating the dependence of the Doppler frequency on the transmitting frequency a skew of the two-dimensional Fourier power spectrum or the two-dimensional autocorrelation function of radar data is measured in that the radar data are subjected to a range Fourier transformation and for the individual range frequencies in a following Doppler centroid estimator a Doppler centroid determination is carried out in the azimuth direction.

By this method the pulse repetition frequency ambiguities are eliminated without any demands having to be made on the data acquisition or a high image contrast; this method can therefore be applied to any region of the raw data matrix. Moreover, no azimuth compression is necessary.

9 Claims, 2 Drawing Sheets

METHOD FOR RESOLVING AMBIGUITY IN THE DETERMINATION OF ANTENNA ANGLE OF VIEW AND DOPPLER FREQUENCY IN SYNTHETIC APERTURE RADAR

BACKGROUND OF THE INVENTION

1. Field of the Invention

The invention relates to a method for resolving ambiguity in the determination of antenna angle of view and Doppler frequency in synthetic aperture radar.

2. Description of the Prior Art

Synthetic aperture radar (SAR) is an active microwave imaging method. A radar transmitting-receiving means usually carried by an aircraft or a satellite coherently records the echoes of high-frequency pulses transmitted at the rate of the pulse repetition frequency (PRF). Usually, the antenna centre axis is aligned approximately perpendicularly to the flight path.

The radar echoes are coherently demodulated, digitized and stored as a complex valued matrix u(i, k), the dimension i standing for distance or "range" and k for flight direction or "azimuth". This socalled raw data can be converted with the aid of a two-dimensional correlation to a highly resolved image of the illuminated area, this also being referred to as "focussing" or "compressing".

In the distance or range direction the radar principle is employed, i.e. determination of the echo travelling time. In the azimuth direction a correlation is performed with a function having the phase history of the echoes of a point scatterer. This is a socalled chirp function, i.e. a function with linearly varying instantaneous frequency with the two-way azimuth antenna pattern as envelope curve. This chirp function can be adequately described by the parameters "FM rate" and "Doppler centroid". The Doppler centroid $f_{DC}$ is the instantaneous frequency at the maximum of the envelope curve. In the case of aircraft SAR and with an antenna centre axis aligned exactly perpendicular to the flight path the Doppler centroid $f_{DC}$ is equal to zero. If the centre axis however differs from said direction by a socalled squint angle $\phi$, then:

$$f_{DC} = -\frac{2v}{\lambda} \cdot \sin \phi \quad (1)$$

where v denotes the flight velocity and $\lambda$ the radar wavelength.

In the case of satellite-supported SAR the rotation of the earth additionally manifests itself in a squint angle between the antenna angle of view and the effective flight path projected onto the earth.

The parameter $f_{DC}$ is absolutely essential for constructing the azimuth correlation kernal for an image focussing. An erroneous Doppler centroid $f_{DC}$ leads to deterioration of the the resolution and the signal to noise ratio, to ghost images and to a geometrical distortion.

In the case of many SAR sensors the squint angle $\phi$ cannot be determined from the sensor attitude and position data accurately enough to satisfy the requirements of the Doppler centroid $f_{DC}$ accuracy. This applies in particular to high-frequency SARs, for example in the X band, and to relatively unstable sensor platforms, such as the Space Shuttle. In such cases the parameter $f_{DC}$ must be determined from the radar echoes themselves.

To determine the angle of view of the antenna the effect is utilized that the antenna pattern is found as the envelope of the azimuth power spectrum. As a result, all $f_{DC}$ estimators are based on the azimuth spectral analysis of the radar data. Since however due to the specific imaging behaviour the SAR signal is sampled in the azimuth direction with the pulse repetition frequency (PRF), a periodic repetition of the azimuth spectrum results. Such methods lead fundamentally to an ambiguity regarding the absolute position of the Doppler centroid $f_{DC}$, and this can be expressed as follows:

$$f_{DC} = \tilde{f}_{DC} + p \cdot PRF \quad (2)$$

where $\tilde{f}_{DC}$ is an estimated Doppler centroid in the base band $[-PRF/2, +PRF/2]$, and p is an integer ambiguity number. For technical reasons the pulse repetition frequency (PRF) is usually chosen so low that the parameter $f_{DC}$ can in fact lie in various PRF bands.

Two methods are known for resolving Doppler frequency ambiguity. In the socalled multiple PRF technique as described by F. K. Li and W. T. K. Johnson in the article "Ambiguities in Spaceborne Synthetic Aperture Radar Systems", IEEE Trans. on Aerospace and Electronic Systems, Vol. AES-19(3), pages 389-397, 1983, at the start and end of the data acquisition the SAR sensor is operated with different pulse repetition frequencies. Depending on the absolute position of the Doppler centroid $f_{DC}$ this leads to different $\tilde{f}_{DC}$ values, from which the correct PRF band can be determined. Disadvantages of this method reside inter alia in that it must be operated already at the data acquisition. and that a wide range of pulse repetition frequencies must be implemented. Moreover, with this method the PRF ambiguity can only be resolved for raw data in which a multiple PRF sequence was activated.

A second method based solely on an analysis of the raw data is the socalled look correlation technique as described for example by A. P. Luscombe in the article "Auxiliary Data Networks for Satellite Synthetic Aperture Radar", in Marconi Review, Vol. XLV, No. 225, 1982, or also by F. G. Cumming, P. F. Kavanagh and M. R. Ito in an article "Resolving the Doppler Ambiguity for Spaceborne Synthetic Aperture Radar" in the Proceedings of IGARSS'86, pages 1639-1643, Zürich, Ref. ESA SP-254, 1986. However, the accuracy of this method drops with the square of the radar frequency and said method is therefore not very suitable for high-frequency SARS. The computational load is considerable because full focussing of the data is necessary; moreover, this method fails with scenes of low image contrast.

SUMMARY OF THE INVENTION

The invention therefore has its objective in the provision of a method for resolving an ambiguity in the determination of antenna angle of view and Doppler frequency in synthetic aperture radar in which the disadvantages of the methods hitherto employed are eliminated.

The invention therefore proposes in a method for resolving an ambiguity in the determination of antenna angle of view and Doppler frequency in synthetic aperture radar (SAR) the improvement in which by the evaluation of the dependence of the Doppler frequency on the transmitted frequency, a skew of the two-dimensional Fourier power spectrum or of the two-dimensional autocorrelation function of radar data is measured in that the radar data are subjected in a range FFT unit to a range Fourier transformation and for the individual range frequencies in a following Doppler centroid estimator a Doppler centroid determination in the azimuth direction is carried out.

Advantageous further developments are set forth in the subsidiary claims.

When using the method according to the invention the Doppler frequency ambiguities are eliminated without making any demands on the data acquisition or on a high image contrast. Consequently, the method according to the invention can be applied to an submatrix of the raw data matrix. Moreover, in the method according to the invention the accuracy is proportional to the first power of the wavelength. Furthermore, no azimuth compression is necessary; also, the method according to the invention can be implemented in simple manner and can moreover be employed not only in synthetic aperture radar (SAR) but in analogous manner also in sonar, ultrasonic, lidar or similar methods.

BRIEF DESCRIPTION OF THE DRAWINGS

Hereinafter the invention will be described in more detail with the aid of a preferred example of embodiment with reference to the accompanying drawings, wherein.

DESCRIPTION OF THE PREFERRED EMBODIMENT

Figure 1:
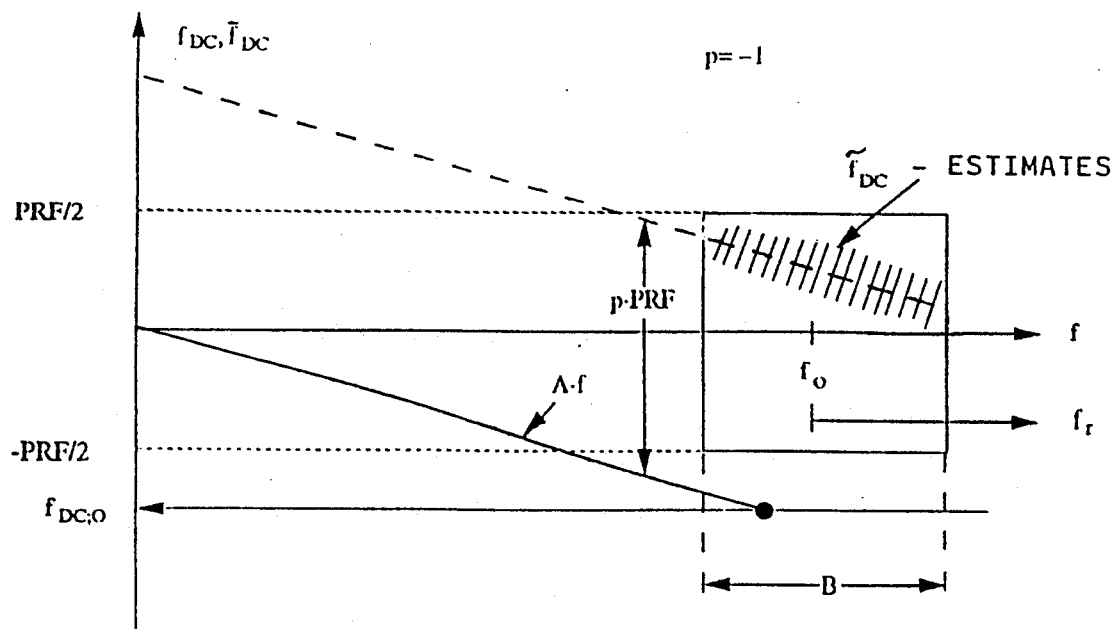
FIG. 1 is a graph for the relationship between the base band Doppler centroid estimates ($\widetilde{f}_{DC}$) and the actual Doppler centroid value ($f_{DC,0}$)

As already explained at the beginning, a Doppler frequency ambiguity can fundamentally not be resolved if the signal analysis is carried out only in the azimuth direction. On the contrary, the two-dimensional nature of the SAR signals must be utilized. According to the invention, to do this use is made of the following phenomenon. By transformation of equation (1) it can be seen how the Doppler centroid value $f_{DC}$ depends on the radar frequency:

$$f_{DC} = -2 \cdot v/c \cdot f \cdot \sin \phi \qquad (3)$$

where c denotes the velocity of light and f the transmitted radar frequency.

In the method according to the invention the fact is utilized that in SAR not only a single frequency f is transmitted; on the contrary, the transmitted high-frequency pulse (usually a chirp pulse) contains frequencies in the band defined below $$f_0 - B/2 \leq f \leq f_0 + B/2 \qquad (4)$$

where $f_0$ denotes the radar carrier frequency and B the range bandwidth. These frequencies are accessible in that the raw data in the range direction is subjected to a Fourier transformation. Thus, the Doppler centroid $f_{DC}$ can no longer be considered a constant but depends linearly on the frequency f; this gives:

$$f_{DC} = f_{DC,0} + A \cdot f_r \qquad (5)$$

with $$A = -2 \cdot v/c \cdot \sin \phi \qquad (6)$$

and with a range frequency $f_r = f - f_0$ and with $f_{DC,0}$ as Doppler centroid for the frequency $f_0$.

Although any Doppler centroid estimate $\widetilde{f}_{DC}$ is restricted in accordance with equation (2) to the base band, the dependence thereof on the range frequency $f_r$ is not subject to the Doppler frequency ambiguity; on the contrary:

$$d\widetilde{f}_{DC}/df_r = df_{DC}/df_r = A \qquad (7)$$

having assumed initially that the squint angle $\phi$ does not change with range frequency $f_r$. Thus, according to the invention base band estimates $\widetilde{f}_{DC}$ at different range frequencies $f_r$ are utilized to determine the slope A. From this, the Doppler centroid $f_{DC,0}$ is determined at the frequency $f_0$ as:

$$f_{DC,0} = A \cdot f_0 \qquad (8)$$

In FIG. 1, in which on the abscissa the frequency f or $f_r$ and on the ordinate the Doppler centroid value $f_{DC}$ or Doppler centroid estimates $\widetilde{f}_{DC}$ are plotted, the equations (7) and (8) are illustrated. The individual $\widetilde{f}_{DC}$ estimates must be very accurate because the slope A to be determined is extremely small. This accuracy requirement thus makes a range compression and a range segmentation of the SAR data necessary prior to the range Fourier transformation. Otherwise, any change of the Doppler centroid over the range would lead to a blurring of $\widetilde{f}_{DC}$ values and thus make more inaccurate.

Fundamentally, the individual $\widetilde{f}_{DC}$ estimates can for example be obtained using a method as described by F. K. Li, D. N. Held, J. Curlander and C. Wu in "Doppler Parameter Estimation for Synthetic Aperture Radars", in IEEE Transaction on Geoscience and Remote Sensing, Vol. GE-23(1), pages 47 to 56, 1985. Since in this method the azimuth power spectrum is analyzed, it is apparent therefrom that with the method according to the invention a skew of the two-dimensional power spectrum and thus of the two-dimensional autocorrelation function of the SAR data is measured.

The method according to the invention can be implemented in simple manner if to estimate the individual $f_{DC}$ values a socalled "correlation Doppler centroid estimator" is used which is described for example by S. N. Madsen in "Estimating the Doppler Centroid of SAR Data", in IEEE Trans., Vol.AES-25(2), pages 134 to 140, 1989. With this "correlation Doppler centroid estimator" the value $\widetilde{f}_{DC}$ can be determined as follows:

$$\widetilde{f}_{DC} = \frac{\phi}{2\pi} \cdot PRF \qquad (9)$$

where $\phi$ is the phase of the autocorrelation function in the azimuth direction for a time difference of 1/PRF and thus the phase of the crosscorrelation coefficient between adjacent azimuth sample values.

Figure 2:
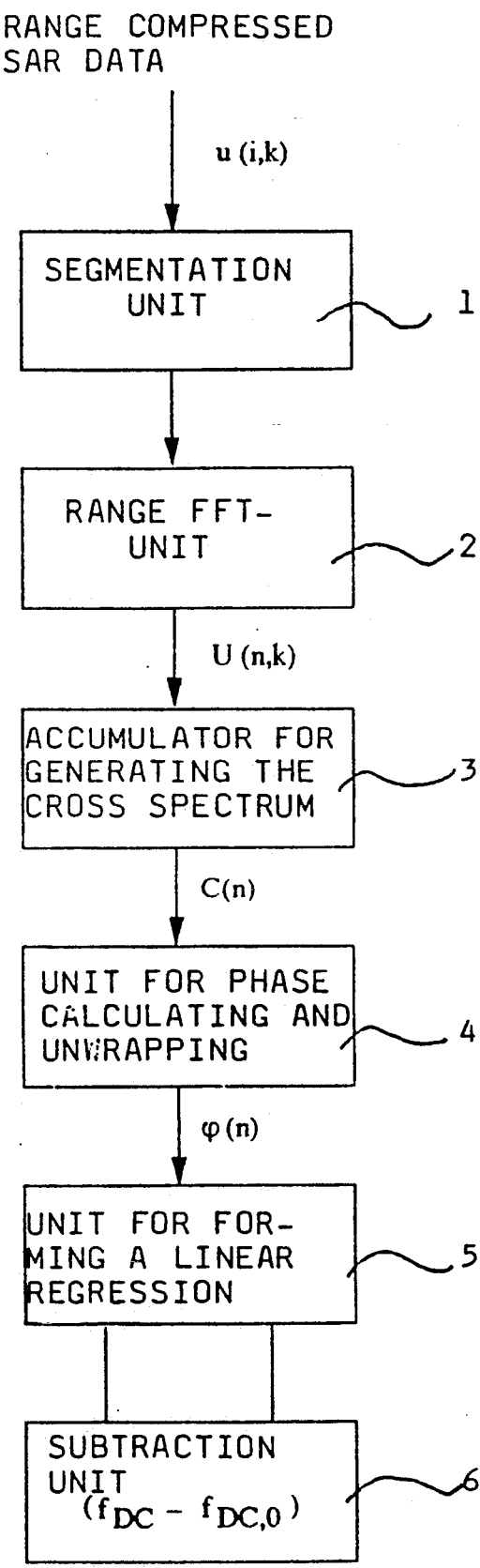

As apparent from the block diagram given in FIG. 2 for carrying out the method according to the invention, the following steps must be carried out. Range compressed SAR data u(i, k) are segmented into shorter segments in the range direction in a segmentation unit 1. The size of the individual segments is chosen so that the Doppler centroid varies within a segment for example by not more than 0.1. PRF. Typical segment sizes are in the order of 32 to 512 range sample values.

Each segment obtained by means of the segmentation unit 1 is Fourier transformed separately in the range direction in a range fast Fourier transform (range FFT) unit 2 so that at the output thereof:

$$U(n, k) = FFT_i\{u(i, k)\} \quad (10)$$

where n is the range frequency index. The socalled "cross spectrum"

$$C(n) = \sum_k U(n, k) \cdot U^*(n, k-1) \quad (11)$$

is calculated in an accumulator 3 to generate the cross spectrum as accumulation of the products of adjacent range spectra.

In a unit 4 for phase calculation and unwrapping a phase $\phi$ of the cross spectrum C(n) is calculated as:

$$\phi(n) = arg\{C(n)\} \quad (12)$$

For the case where the phase function $\phi$ (n) crosses a PRF band boundary, i.e. leaves the interval $[-\pi, +\pi]$, an integer multiple of $2\pi$ is added to the phase $\phi$ (n), so that it is smoothly continued at the boundary, this being referred to in the technical literature as unwrapping.

In a following unit 5 for forming a linear regression, the desired proportionality constant A is formed by such a linear regression from the phase $\phi$ (n) using equation (7), that is:

$$A = \widetilde{df_{DC}}/df_r = \frac{PFR}{2\pi} \cdot d\phi/df_r \quad (13)$$

and an estimate of the base band Doppler centroid $\widetilde{f_{DC, 0}}$ is obtained for the frequency $f = f_O$. This gives for the estimated absolute Doppler centroid $f_{DC, 0}$:

$$f_{DC, 0} = A \cdot f_O$$

In the regression analysis only phase values within the range bandwidth employed are taken into account.

To increase the accuracy of the estimate of the Doppler centroid $f_{DC, 0}$, preferably in a following subtraction unit 6 the differences $f_{dc, 0} - \widetilde{f_{DC, 0}}$ obtained in the various range segments are determined. An offset value $f_{DC, offset}$ to be determined once is subtracted from the estimate determined for the Doppler centroid $f_{DC, 0}$. This offset value $f_{DC, offset}$ can result from the assumption $d\phi/df = 0$ made in equation (7) not always being exactly fulfilled by real SAR antennas.

Instead of analyzing the phase $\phi$ (n) the cross spectrum C(n) can also be transformed by an inverse Fourier transformation to the time domain. From the position $\tau_O$ of the maximum of this time function the Doppler centroid value $f_{DC,0}$ can be determined as follows:

$$f_{DC, 0} = -f_O \cdot PRF \cdot \tau_O \quad (14)$$

In order to determine $\tau_O$ an interpolation of said time function is necessary.

The method according to the invention can be implemented both in hardware and in software. However, the method is particularly suitable for real time hardware SAR processors because it does not require complicated multiple processing of data. Nor does the method according to the invention intervene in the actual SAR focussing process. It can thus simply be added to an existing SAR processor and can be run separately. The accuracy of the method according to the invention increases with the number of sample values used. Also, an initially coarse estimate of the Doppler centroid becomes increasingly accurate while more and more samples are processed.

Figure 3:
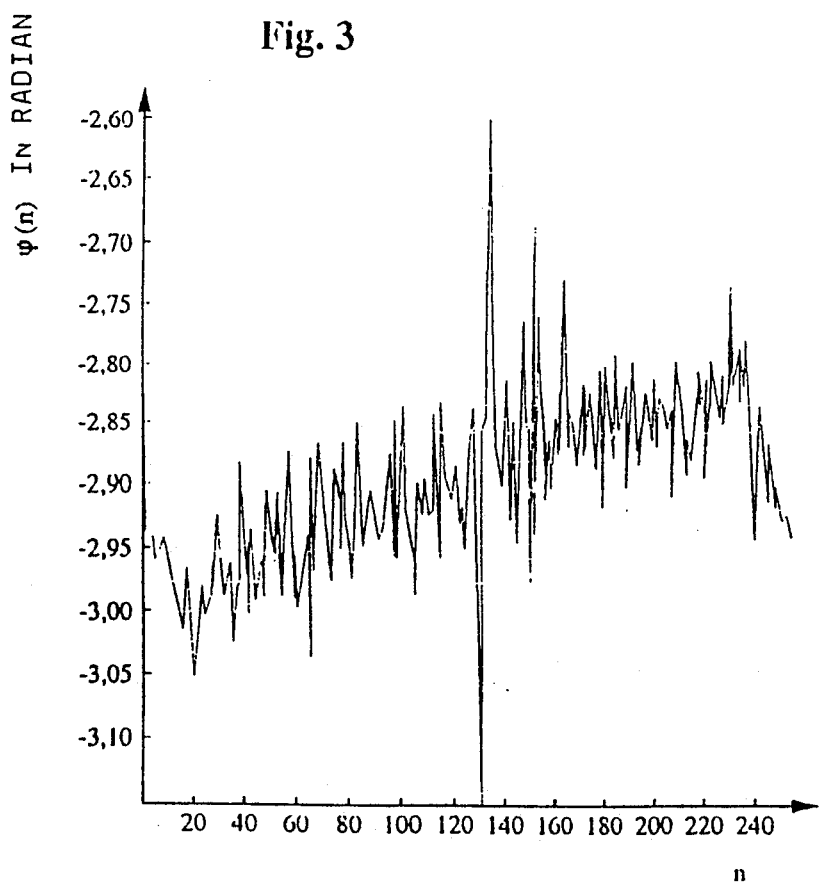
FIG. 2 is a block diagram of an embodiment for carrying out the method according to the invention and FIG. 3 is a graph made with the aid of the method according to the invention.

In accordance with the block diagram of FIG. 2, to control and check the method according to the invention a prototype was implemented. As raw data Seasat SAR data with different image content were used. In FIG. 3, in which along the abscissa the range frequency index n and along the ordinate the phase $\phi$ (n) is plotted in radians, one of the phase functions $\phi$ (n) obtained is given. The FFT length in this example is 256.

Furthermore, in a Table the results of seven measurements are listed. Here, in each case a data matrix of the extent 1024 (range)×4096 (azimuth) was processed. Since in Seasat the pulse repetition frequency PRF is 1647 Hz, the accuracies listed in the Table always suffice to identify the correct PRF band with a±2·$\delta$ accuracy, i.e. with 95% probability, $\delta$ denoting the standard deviation of the estimate $f_{DC,O}$.

The results obtained may be extrapolated to other SAR systems. The accuracy is proportional to the radar wavelength and the number of data required then increases in accordance with the square root law of statistics with the square of the radar frequency.

TABLE

| Data Set | Scene Content | Doppler Centroid | std ($f_{DC, 0}$) |
|---|---|---|---|
| North Sea SE 287, Rev. 1258 | ocean with ships | 973 Hz | 81 Hz |
| Atlantic SE 250, Rev. 1359 | ocean surface with waves | 728 Hz | 100 Hz |
| Mediterranean Sea SE 202, Rev. 590 | uniform ocean surface | −1339 Hz | 108 Hz |
| Faroer SE 093, Rev. 1149 | ocean with mountainous islands | −852 Hz | 279 Hz |
| Flevopolders SE 111, Rev. 891 | agricultural fields, lake strongly scattering greenhouses | −825 Hz | 308 Hz |
| Greenland SE 163, Rev. 719 | mountains, glaciers, coast line | −450 Hz | 416 Hz |
| Isere SE 276, Rev. 762 | mountains | −1115 Hz | 460 Hz |

We claim:

1. A method for resolving ambiguity, caused by sampling with a pulse repetition frequency, in the determination of antenna angle of view and Doppler frequency in synthetic aperture radar (SAR) comprising
   utilizing that linear dependence of the Doppler frequency on a transmitting frequency is unambiguous;
   and estimating the linear dependence of the Doppler frequency on the transmitting frequency from radar data.

2. The method of claim 1 further comprising
   subjecting the radar data in a range fast Fourier transform (FFT) unit to a range Fourier transformation;

and carrying out a Doppler centroid determination in azimuth for individual range frequencies in a following Doppler centroid estimator.

3. The method of claim 1 further comprising
measuring the linear dependence of the Doppler frequency on the transmitting frequency;
explicitly calculating a two-dimensional Fourier power spectrum of data from the synthetic aperture radar (SAR);
and determining a skew thereof determined therefrom by means of established moment computation.

4. The method of claim 1 further comprising
measuring the linear dependence of the Doppler frequency on the transmitting frequency;
explicitly calculating a two-dimensional autocorrelation function;
and determining a skew thereof determined therefrom by means of established moment computation.

5. Apparatus for performing the method for resolving ambiguity in the determination of antenna angle of view and Doppler frequency in synthetic aperture radar (SAR) comprising
segmentation means to segment range compressed synthetic aperture radar (SAR) data into shorter segments in the range direction;
fast Fourier transform means connected to said segmentation means to Fourier transform each segment obtained from said segmentation means separately in the range direction;
accumulator means connected to said transform means to generate cross spectrum as an accumulation of products of adjacent range spectra;
phase calculating and unwrapping means connected to said accumulator means to unwrap a phase of the cross spectrum producing a signal where the phase function crosses a pulse repetition frequency (PRF) band boundary;
linear regression forming means connected to said phase calculating and unwrapping means for estimating a base band Doppler centroid for phase values within a desired range bandwidth;
and subtraction means connected to said linear regression forming means to determine differences in various range segments and determine an offset value subtracted from said Doppler centroid.

6. A method for resolving ambiguity, caused by sampling with a pulse repetition frequency, in the determination of antenna angle of view and Doppler frequency in synthetic aperture radar (SAR) comprising the steps of
sampling data with the pulse repetition frequency;
range compression and range segmentation of data from the synthetic aperture radar;
range Fourier transformation of the range segmented data;
determining a Doppler centroid at each of a plurality of range frequencies with linear dependence of the Doppler frequency on a transmitting frequency being unambiguous.

7. A method for resolving ambiguity, caused by sampling with a pulse repetition frequency, in the determination of antenna angle of view and Doppler frequency in synthetic aperture radar (SAR) comprising the steps of
assembling radar data to compare linear dependence of the Doppler frequency on transmitting frequency;
range fast Fourier transforming the radar data;
determining Doppler centroid in azimuth for individual range frequencies including
performing of complex conjugate multiplying of every two range lines with fixed mutual distance in azimuth after being Fourier transformed,
obtaining an accumulation which is a cross spectrum from adding up the multiplication results,
and comparing the linear dependence of the phase of the cross spectrum on the range frequency.

8. The method of claim 7 wherein
said evaluating of the linear dependence is done by linear regression.

9. The method of claim 7 further comprising
measuring the linear dependence of the phase of the cross spectrum of the phases of the range frequencies by transforming the cross spectrum back to a time domain;
and determining by interpolation a position of a maximum of a resulting time function.

* * * * *